INVENTOR.
JOSEPH R. BURNS
BY John V. Regan
Attorney

Nov. 8, 1966 J. R. BURNS 3,284,782
MEMORY STORAGE SYSTEM
Filed Feb. 16, 1966 2 Sheets-Sheet 2

INVENTOR.
JOSEPH R. BURNS
BY John V. Regan
Attorney

United States Patent Office 3,284,782

Patented Nov. 8, 1966

3,284,782

MEMORY STORAGE SYSTEM

Joseph R. Burns, Trenton, N.J., assignor to Radio Corporation of America, a corporation of Delaware Filed Feb. 16, 1966, Ser. No. 527,788
12 Claims. (Cl. 340—173)

Figure 1:
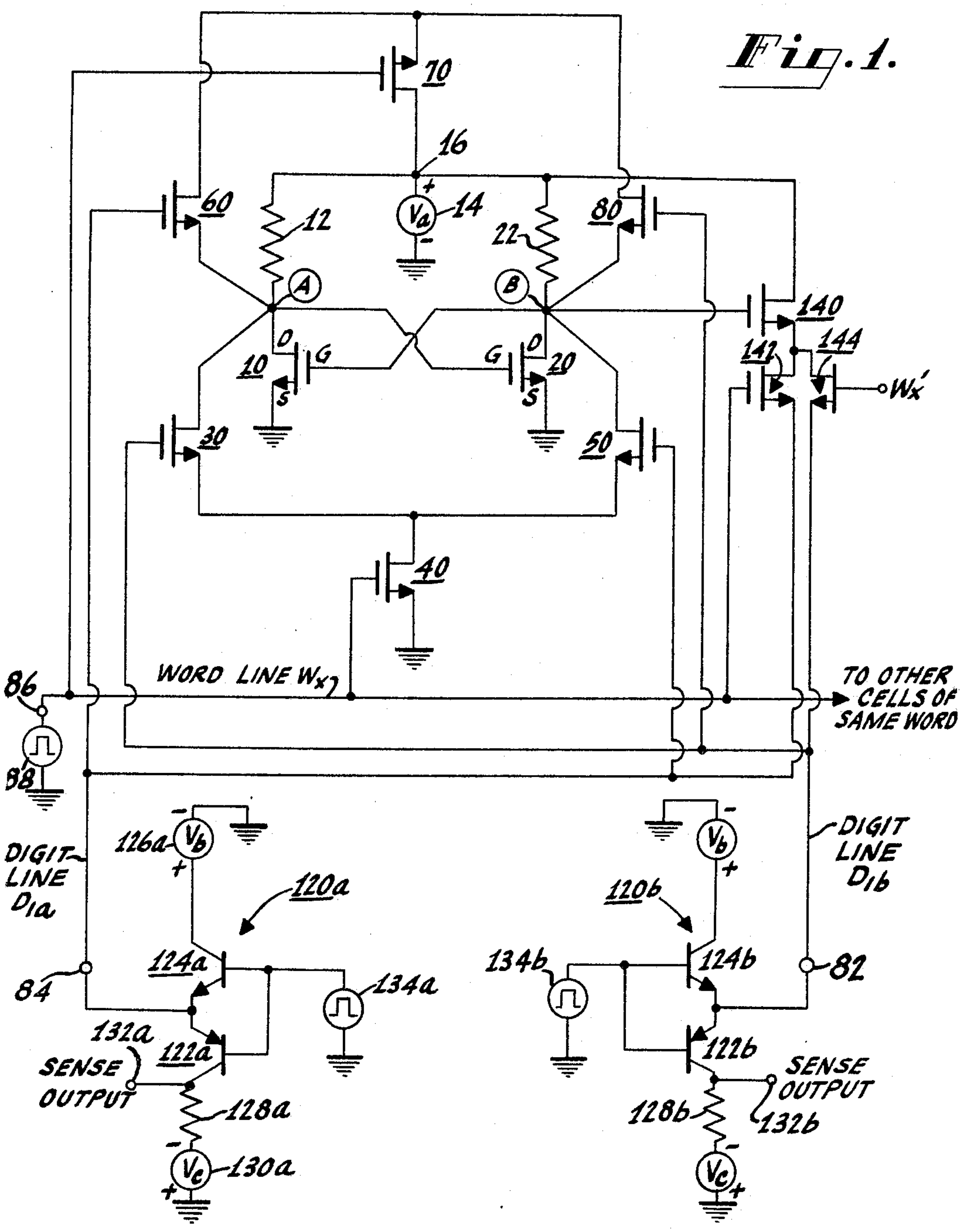

This invention relates to active storage cells which have low steady-state power dissipation, and to memory systems employing such cells.

It has been suggested that a high speed memory for a data processing system take the form of a plurality, e.g., an array of active memory elements or storage cells. Apart from the maximum speed of operation of the storage cells per se, a higher memory operating speed can be achieved if information can be retrieved nondestructively from the memory. Still higher speed of operation can be achieved, for example in a word-organized memory, if more than one word of information can be retrieved from the memory at the same time.

Accordingly, it is one object of this invention to provide an improved memory system of active storage cells in which information can be read out of the memory nondestructively.

It is another object of this invention to provide an improved memory system in which more than one word or message, stored in memory, can be retrieved at the same time.

It has been suggested that the memory cells of an active memory employ flip-flops, and that the entire memory array be fabricated as an integrated structure. One of the requirements of a practical integrated array of active elements is that the steady-state power dissipation be very low. When the active elements are flip-flops, this requirement essentially means that the values of the load impedances for the amplifying devices in the flip-flop should be as large as possible, and that the supply voltages be as low as possible. However, as is known, the speed at which a flip-flop can be switched from one steady state condition to the other is directly proportional to the values of the load impedances, and inversely proportional to the supply voltage.

Accordingly, it is an object of this invention to provide an improved flip-flop of active elements which has a high switching speed and very low steady state power dissipation.

It is another object of this invention to provide a storage cell of the active flip-flop type in which the switching speed of the flip-flop is essentially independent of the values of the load impedances.

It is still another object of this invention to provide an active flip-flop in which the load impedances may have very high values, for low steady-state power dissipation, and in which the load impedances are effectively shunted by low impedance paths during a switching transient.

An improved storage cell embodying the invention comprises first and second cross-coupled transistors having first and second load impedances, respectively, of very large value. Third and fifth transistors are connected in shunt with the first and second transistors, respectively, by way of a fourth transistor, and sixth and eighth transistors are connected in shunt with the first and second load impedances, respectively, by way of a seventh transistor. Signals applied to the various shunting transistors during a switching transient effect a low impedance path in shunt with one of the first and second transistors and in shunt with the load impedance of the other one of the first and second transistors. Further, in the storage cell of the present invention, the transistors may be of the same conductivity type.

A plurality of storage cells of the type described above may be functionally arranged in rows and columns to provide a memory of active storage cells. A novel output circuit arrangement is provided for each cell, whereby the information stored in the cells of any two rows may be selectively read out at the same time.

Figure 2:
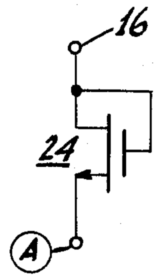
Figure 3:
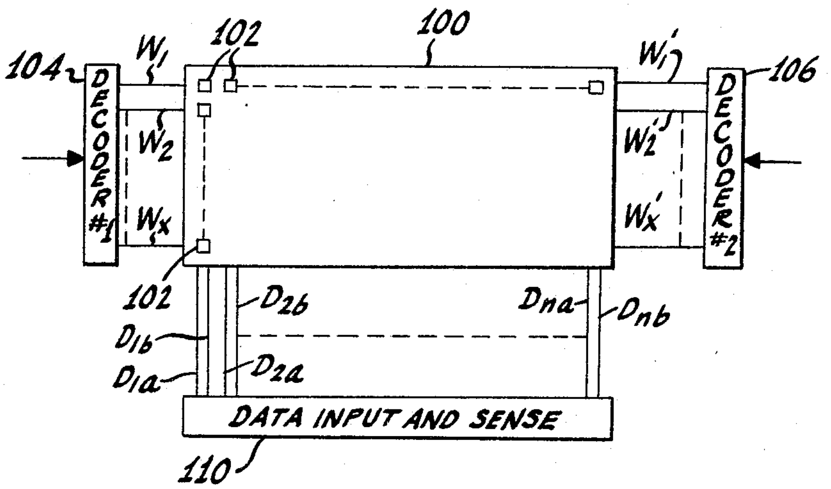

In the accompanying drawing, like reference characters denote like components; and FIGURE 1 is a schematic diagram of an improved storage cell embodying the invention, and a novel output circuit and other components which may be used when the storage cell is employed as a component part of a word-organized memory;

FIGURE 2 is a schematic diagram illustrating the manner in which a field-effect transistor may be connected in the FIGURE 1 circuit to function as a load impedance for an active flip-flop element; and FIGURE 3 is a block diagram of a word-organized memory, which may employ improved storage cells of the type illustrated in FIGURE 1, and in which two words of information may be retrieved from the memory at the same time.

The improved storage cell portion of the FIGURE 1 circuit will first be described and its various uses discussed. Thereafter, the additional circuitry which may be employed to adapt the novel flip-flop for use in an improved word-organized memory will be discussed.

The storage cell employs a plurality of active devices, e.g., transistors. This cell will be described in terms of its using so-called field-effect transistors because of the desirable characteristics of the latter devices which render their use particularly desirable in an integrated structure. These field-effect devices are of the type known in the art as insulated-gate field-effect transistors.

Two types of insulated-gate field-effect transistors suitable for use in the circuits described herein are the thin-film transistor (TFT) and the metal-oxide-semiconductor (MOS). The physical and operating characteristics of a thin-film transistor are described in an article , by P. K. Weimer, entitled "The TFT–A New Thin-Film Transistor," appearing at pages 1462–1469 of the June 1962 issue of the Proceedings of the IRE. The MOS transistor and its characteristics are described in an article entitled, "The Silicon Insulated-Gate Field-Effect Transistor," by S. R. Hofstein and F. P. Heiman, appearing at pages 1190–1202 of the September 1963 issue of the Proceedings of the IEEE.

Suffice it to say here that an insulated-gate field-effect transistor may be of either the enhancement type of the depletion type. The enhancement type unit is of particular interest in the present application. When a device is operated in the enhancement mode, only a small leakage current flows over the conduction path between source and drain when the voltages at the gate and source have the same value. Current flows between source and drain when the voltage at the gate is increased in a first polarity direction relative to the voltage at the source.

Essentially, the conductivity of the semiconductor material in the conducting channel between source and drain is controlled by the voltage applied between the gate and source. When the semiconductor is N-type conductivity material, current flows between source and drain when the gate voltage is positive relative to the source voltage.

The flip-flop portion of the storage cell comprises first and second field-effect transistors 10 and 20, illustrated as being N-type transistors, each having its drain cross-coupled by negligible impedance means to the gate of the other transistor. The sources of each of the first and second transistors are connected to a first circuit point, illustrated by the conventional symbol for circuit ground. First transistor 10 has its drain connected by way of an impedance element 12 to a second circuit point 16 of $+V_a$ volts, established by means of a bias source 14 having its positive terminal connected at the second circuit point 16 and having its negative terminal grounded. A second impedance element 22 is connected between the drain of second transistor 20 and the second circuit point.

In the interest of providing a flip-flop having very low power dissipation in the steady state, the value of $V_a$ and the value of the impedance elements 12 and 22 are chosen to give minimum standby power consistent with the overall stability of the flip-flop. Thus, $V_a$ should have as low a value as practical, while the values of impedance elements 12, 22 should be as high as practical. By way of example, the impedance element 12 may be another field-effect transistor 24, connected as illustrated in FIGURE 2, having its source connected to node A, its drain connected to the second circuit point 16, and having its gate connected directly to the drain. The other impedance element 22 may also be a field-effect transistor connected in a similar manner between output node B and second circuit point 16.

When the load impedance elements 12 and 22 of a conventional flip-flop have very high values, the switching speed of the flip-flop is very slow. This is due to the fact that the capacitances appearing between circuit ground and the output nodes A and B must be charged through these load impedances. In the circuit of FIGURE 1, high speed is achieved by the provision of low impedance shunt paths provided by the combination of other N-type field-effect transistors, which will now be described.

A third transistor 30 has its conduction path connected in series with the conduction path of a fourth transistor 40, in that order, between node A and circuit ground. A fifth transistor 50 has its conduction path connected in series with the conduction path of fourth transistor 40, in that order, between output node B and circuit ground. A sixth transistor 60 has its conduction path serially connected with that of a seventh transistor 70 between output node A and the positive terminal of bias source 14, and an eighth transistor 80 has its conduction path serially connected with that of the seventh transistor 70 between output node B and the bias source 14.

The gates of third transistor 30 and eighth transistor 80 are connected electrically in common to a first input signal point 82. Fifth transistor 50 and sixth transistor 60 have their gates connected electrically in common to a second input signal point 84; and fourth transistor 40 and seventh transistor 70 have their gates connected electrically in common to a third input signal point 86.

The storage cell as thus described has a wide range of applications. For example, the ceill may be used as one stage of a shift register, or it may be used as one stage of an active memory. In a shift register application, input signal points 82 and 84 are connected to different outputs of the preceding storage cell in the shift register, whereby one of these input points receives a relative high level signal while the other input signal point is receiving a relatively low level signal, and vice versa. Signals for shifting the information in the register then would be applied at input signal point 86.

Consider now the operation of the storage cell, and assume that the storage cell is one stage of the shift register. In that event, the inputs at signal input points 82 and 84 will have a value of approximately $+V_a$ volts or ground potential, depending upon the state of the previous stage in the register. Ordinarily, the voltage applied at third input signal point 86 is at ground potential. Thus, in the steady state of the circuit, both of the fourth and seventh transistors 40 and 70 are biased in a nonconducting condition, and little or no current flows through any of the third through eighth transistors 30 . . . 80.

When the voltage at third input point 86 is raised to $+V_a$ volts during an information shift period, low impedance paths will be provided in shunt with one of the flip-flop transistors 10, 20 and the impedance element 12, 22 of the other flip-flop transistor in dependence upon the voltages applied at input signal points 82 and 84. For example, assume that the voltage at second input point 82 has a value of $+V_a$ volts and that the voltage at second input point 84 is at ground potential. When the shift pulse signal source 88 provides an output of $+V_a$ volts, third and eighth transistors 30, 80 are biased in a low impedance condition by the voltage at input signal point 82, and fourth and seventh transistors 40, 70 are biased in a low impedance state by the shift pulse. Accordingly, the series combination of third and fourth transistors 30, 40 provides a low impedance shunt path between output node A and circuit ground, i.e., across first transistor 10.

Concurrently therewith, seventh and eighth transistors 70, 80 provide a low impedance path from output node B to the positive terminal of bias source 14, i.e., across output impedance element 22. Third and fourth transistors 30, 40 provide a low impedance path for the rapid discharge of any capacitance at output node A and drive the voltage at node A rapidly to ground potential. Seventh and eighth transistors 70 and 80 provide a low impedance path for rapidly charging the capacitance at output node B, thereby driving the voltage at output node B rapidly toward $+V_a$ volts. The flip-flop may be considered to be in the set state, storing a binary "1" condition, when the output voltages have these values. It should be noted that for the input voltage conditions given, the flip-flop is forced to assume the aforementioned output conditions rapidly and irrespective of the values of the load impedances 12, 22. Moreover, the output voltages reach these conditions without requiring the usual regeneration in the flip-flop transistors 10 and 20 and their cross-coupling networks.

Following the termination of the shift pulse all of the shunt paths through the external transistors revert to a high impedance state. If the voltage at second input point 84 has the value of $+V_a$ and the voltage at first input signal point 82 is at ground potential when the next shift pulse is applied, fourth, fifth, sixth and seventh transistors become biased in a low impedance condition, and provide low impedance shunt paths between output node B and circuit ground and between output node A and the positive terminal of bias source 14. The voltage at output node B then is driven rapidly to ground potential, while the voltage at output node A is raised rapidly from ground potential to $+V_a$ volts.

It should be noted that sixth, seventh and eighth transistors 60, 70, 80 operate as source followers when biased in the on condition. As in the case of bipolar transistors, these devices have a conducting threshold which must be exceeded in order for the device to have a low impedance conduction path. Since in the shift register application, as described above, the more positive input voltage applied at the gates of these transistors has a value of $+V_a$ volts, and since the high level voltage at output node A or B has a final value of $+V_a$ volts, it may be seen that any of the on transistors 60, 70 or 80 will revert to a high impedance state before the output voltage at the associated node A or B reaches $V_a$ volts. In that event, the remaining current for charging the output capacitance must be supplied through one or the other of the output impedance elements 12 or 22, which have high impedance values. Thus, although the first and second transistors 10 and 20 may be switched rapidly, the output voltages at nodes A and B may not reach their signal steady state as rapidly.

Even faster operation of the flip-flop is possible if the high level of the input signals is more positive than $V_a$ volts, i.e., if the difference in voltage between the first and second input signal values is greater than $V_a$ volts. In that case, the source follower transistors 60, 70 and 80 will remain biased on in a low impedance condition to drive the output voltages at the respective nodes A and B to the full, final value of $V_a$ volts. Furthermore, the impedance of the shunt path is much less under these conditions, since the impedance of an on transistor's conduction channel varies as an inverse function of the source-to-gate voltage. Advantage is taken of this fact when the storage cell is used as a storage element in a memory, which will now be described.

FIGURE 3 is a block diagram of a word-organized memory system, illustrative of one example of a memory in which storage cells embodying this invention may be incorporated. Box 100 is an array of storage cells 102 functionally arranged in a plurality of rows and columns. Each row of the memory 100 may store a different word, i.e. message, etc., of information. At the left of the drawing is a first decoder 104 which has a number of WORD lines $W_1$, $W_2$ . . . $W_x$, wherein each WORD line is associated with a different row of storage cells, there being one WORD line for each row of the memory. At the right of the drawing is a second decoder 106 which has a number of output WORD lines $W_1'$, $W_2'$ . . . $W_x'$. Each of the latter lines is associated with a different row of storage cells, and there is one line for each row. Accordingly, each row of storage cells has two WORD lines associated therewith, one from decoder 14 and one from decoder 106.

The memory may be of the type which has two DIGIT lines for each column of the memory. Thus, DIGIT line $D_{1a}$ is the first DIGIT line for column 1 and $D_{1b}$ is the second DIGIT line for column 1. All of the DIGIT lines are connected to a box 110, labeled "data input and sense." The latter, as will be clear hereinafter, supplies the data input signals to be written into memory, and also has means for sensing the outputs of the memory during a read operation. One advantage of this scheme is that information may be both written into a memory cell and read out of a memory cell by way of the same DIGIT line, a feature which is of importance in an integrated memory wherein the number of lines must necessarily be kept to a minimum. A further feature which will become apparent is that two words in the memory, i.e., two rows of data, may be read out of memory at the same time, one word being selected by decoder 104 and the second word being selected by the decoder 106.

Each of the memory cells may be of the type illustrated in FIGURE 1 and described previously. Let it be assumed that the cell in FIGURE 1 represents the memory cell at the intersection of WORD line X and the DIGIT lines $D_{1a}$ and $D_{1b}$. In that event, the first input signal point 82 (FIGURE 1) may be the input end of DIGIT line $D_{1b}$, and the second input signal point 84 may be at the input end of the DIGIT line $D_{1a}$. As mentioned previously, these DIGIT lines are common to all of the storage cells in the first column. Third input signal point 86 may be at the input end of the WORD line $W_x$ coming from decoder 104, and the signal source 88 may be a driver in the decoder block.

The second input signal point 84 is connected at the output of a circuit 120*a*, which is a common digit input-sense output circuit. This circuit comprises a first PNP bipolar transistor 122*a* and a second, NPN bipolar transistor 124*a* having their respective emitter electrodes connected together and to the second signal input point 84. The collector electrode of transistor 124*a* is connected directly to the positive terminal of a source 126*a* of $V_b$ volts, the negative terminal of the source being grounded. First transistor 122*a* has its collector connected by way of a resistor 128*a* to the negative terminal of a source 130*a* of negative potential, the positive terminal thereof being grounded. An output terminal 132*a* is connected at the collector of first transistors 122*a*. An input signal source 134*a*, e.g. a driver, is connected in common to the base electrodes of the first and second transistors 122*a*, 124*a*.

A second, similar digit input-sense output circuit 120*b* is provided for the other DIGIT line $D_{1b}$. Those elements in the circuit 120*b* which correspond to those in the first circuit 120*a* are given the same reference numeral followed by the character "*b*."

The input sources 134*a* and 134*b* provide outputs of such value that the voltage applied to a DIGIT line has either a value of approximately ground potential or a value which is preferably more positive than $V_a$. Consider circuit 120*a* for example. When the voltage supplied by input source 134*a* is at its lower level, first transistor 122*a* is biased on and second transistor 124*a* is biased off. The voltage on the DIGIT line $D_{1a}$ at that time is approximately ground potential. When the voltage supplied by input source 134*a* is at its higher level, second transistor 124*a* conducts and first transistor 122*a* is nonconducting. The voltage on the DIGIT line $D_{1a}$ then has a value more positive than $V_a$ volts.

Information stored in the cell may be read out by way of a pair of N-type transistors 140 and 142 having their conduction paths serially connected, in that order, between the second circuit point 16 and DIGIT line $D_{1a}$. The gate of transistor 140 is connected at output node B and the gate of transistor 142 is connected to WORD line X. To provide for the concurrent read-out of two rows of the memory, an additional transistor 144 has its conduction path connected between the junction of transistors 140, 142 and the other DIGIT line $D_{1b}$. The gate of this latter transistor is connected to WORD line $W_x'$.

The operation of the memory cell will now be described. When it is desired to write a binary "1" into the storage cell, input signal source 134*b* is operated to provide a high level input at the base electrodes of transistors 122*b* and 124*b*. Concurrently, input signal source 134*a* supplies a low level signal. Thus, the voltage on DIGIT line $D_{1a}$ is close to ground and the voltage on DIGIT line $D_{1b}$ is more positive than $V_a$ volts. To write the information into the memory cell, the voltage on WORD line X is raised from ground potential to a value more positive than $V_a$ volts. Transistors 30, 40, 70 and 80 then are biased in the on condition and present low impedance paths across impedance element 22 and first transistor 10. As a consequence thereof, the voltage at output node A remains at, or rapidly falls to ground potential, and the voltage at output node B either remains at or rapidly is raised to $+V_a$ volts.

On the other hand, if input signal source 134*a* were supplying the high level signal and input signal source 134*b* were supplying the low level signal, transistors 40, 50, 60 and 70 would be biased in the on condition when the word pulse were present. In that event, a low impedance path would be provided in shunt with second transistor 20 and a second low impedance path would be provided in shunt with output impedance element 12. The voltage at output node A would rise rapidly to $+V_a$ volts, and the voltage at node B would fall rapidly to ground potential.

In order to sense the data stored in the memory cell, a positive voltage level may be applied to either the WORD line $W_x$ or the WORD line $W_x'$ at a time when the outputs of both of the signal input sources 134*a* and 134*b* are at their low level. When these sources provide low level outputs, the voltages on both of the DIGIT lines $D_{1a}$ and $D_{1b}$ are clamped at approximately ground potential by the emitter follower action of transistors 122*a* and 122*b*. Consequently, transistors 30, 50, 60 and 80 in the storage cell are biased off, and the state of the storage cell cannot be changed.

If the storage cell is storing a binary "1" condition at this time, the voltage at node B has a value of $+V_a$ volts. This voltage biases transistor 140 in the read circuit in the on condition. If the voltage on WORD line $W_x$ is at the high level at this time, transistor 142 also is biased in the on condition. A current then flows from the positive terminal of the bias source 14, through the conduction channels of transistors 140 and 142, over the DIGIT line $D_{1a}$ and through transistor 122*a* and the collector resistor 128_a_ to the bias source 130_a_. The current flow through the collector resistor 128_a_ produces a voltage drop which may be sensed at the output terminal 132 and interpreted as indicating that the flip-flop is storing a binary "1." On the other hand, if the flip-flop were storing a binary "0," the voltage at output node B of the flip-flop would be at ground potential, transistor 140 would be biased off, and no current would flow through the collector resistor 128_a_.

The information stored in the cell also may be read out by applying a high level voltage on WORD line $W_x'$. In that event, current flows from the $V_a$ source 14 through transistors 140 and 144, transistor 122_b_ and collector resistor 128_b_ in the second circuit 120_b_ when the flip-flop is storing a binary "1." The current flow through resistor 128_b_ results in a voltage drop which may be sensed at output terminal 132_b_. On the other hand, if the cell is storing a binary "0," the voltage at node B is at ground potential, transistor 140 is biased off, and there is no voltage drop across the collector resistor 128_b_.

In the operation of the memory system (FIGURE 1) corresponding WORD lines from the two decoders 104 and 106 are never energized simultaneously during a memory read-out. When it is desired to read out two words of memory at the same time, the WORD line for one of the rows is energized by decoder 104 and the information is read out on the sense amplifier associated with the first DIGIT lines, e.g. $D_{1a}$, $D_{2a}$, etc. The WORD line for the other row is energized by the decoder 106, and the information for that word is read out on the sense line associated with the other DIGIT lines $D_{1b}$, $D_{2b}$, etc. By providing means for reading out two words from memory at the same time, various operations in the information handling system may be performed in a much shorter period of time.

Although the circuit in FIGURE 1 has been illustrated and described as having the transistors 142 and 144 connected to the common DIGIT lines $D_{1a}$ and $D_{1b}$, respectively, it will be appreciated that the outputs of these transistors could be supplied to other types of sensing circuits which are independent of the digit drivers. Further, although all of the field-effect transistors are illustrated as being N-type conductivity, it will be appreciated that transistors of P-type conductivity also could be employed, provided that the usual changes are made in the connections to the bias sources, the levels of the input signals, etc., and provided further that the driver-sense circuits are re-arranged to drive transistors of the P-type conductivity.

What is claimed is:

1. The combination comprising:

first and second circuit points;

a plurality of transistors, each transistor having an input electrode and an output electrode defining the ends of a conduction path through the transistor, and a control electrode;

means connecting the input electrodes of first and second ones of said transistors to the first circuit point;

first and second impedance means each connected in a separate circuit between the second circuit point and the output electrode of a different one of the first and second transistors;

means cross-coupling the output electrodes of the first and second transistors to the control electrodes of the second and first transistors, respectively;

a third transistor having its conduction path connected between the output electrode of the first transistor and said first circuit point by way of the conduction path of a fourth one of the transistors;

a fifth one of the transistors having its conduction path connected between the output electrode of the second transistor and the first circuit point by way of the conduction path of the fourth transistor;

a sixth transistor having its conduction path connected between the output electrode of the first transistor and the second circuit point by way of the conduction path of a seventh one of the transistors; and an eighth one of the transistors having its conduction path connected between the output electrode of the second transistor and said second circuit point by way of the conduction path of the seventh transistor.

2. The combination as claimed in claim 1, wherein all of said transistors are of the same conductivity type, and including first input means connected in common to the control electrodes of the third and eighth transistors; second input means connected in common to the control electrodes of the fifth and sixth transistors; and third input means connected in common to the control electrodes of the fourth and seventh transistors.

3. The combination as claimed in claim 2, including separate means for applying input signals having either a first or a second value individually to the first, second and third input means, wherein the signal applied to the first input means has the first value whenever the signal applied to the second means has the second value, and vice versa.

4. The combination as claimed in claim 3, including means for connecting a source of voltage between the first and second circuit points, wherein the difference in voltage between said first and second circuit points is less than the difference in potential between the first and second values of an applied input signal.

5. The combination as claimed in claim 2, wherein each of the transistors is a field-effect transistor, and wherein the input, output and control electrodes are source, drain and gate electrodes, respectively.

6. The combination as claimed in claim 5, wherein the first and second impedance means are ninth and tenth field-effect transistors, respectively, of said same conductivity type, wherein the conduction path of the ninth transistor is connected in circuit between the second circuit point and the output electrode of the first transistor, wherein the conduction path of the tenth transistor is connected in circuit between the second circuit point and the output electrode of the second transistor, wherein the gate electrode of the ninth transistor is connected to one of the source and drain electrodes of the ninth transistor, and wherein the gate electrode of the tenth transistor is connected to one of the source and drain electrodes of the tenth transistor.

7. The combination as claimed in claim 5, including ninth and tenth field-effect transistors of said same conductivity type; first output means; means connecting the conduction paths of the ninth and tenth transistors in series between a point of fixed potential and the first output means; means connecting the gate electrode of the ninth transistor to the drain electrode of one of the first and second transistors; and means for applying a control signal at the gate electrode of the tenth transistor.

8. The combination as claimed in claim 7, including an eleventh field-effect transistor of said same conductivity type and a second output means; means connecting the conduction paths of the ninth and eleventh transistors in series, in that order, between a point of fixed potential and the second output means; and means for applying a control signal selectively at the gate electrode of said eleventh transistor.

9. The combination as claimed in claim 8, wherein the gate electrode of one of the tenth and eleventh transistors is connected to the gate electrodes of the fourth and seventh transistors.

10. The combination comprising:

a plurality of memory cells functionally arranged in rows and columns;

first and second sense lines for each column of memory cells;

a set of first row lines, one for each row of memory cells;

a set of second row lines, one for each row of memory cells;

means for selectively energizing one of said first row lines for reading out the information in the associated row of memory cells to the first sense lines; and means for selectively energizing one of said second row lines for reading out the information in the associated row of memory cells to the second sense lines.

11. The combination as claimed in claim 10, wherein each memory cell has a first output gate and a second output gate each connected to receive the output of the associated memory cell, means coupling the output of the first gate to the associated first sense line, means coupling the output of the second gate to the associated second sense line, and means coupling the associated first and second row lines to the inputs of the first and second gates, respectively.

12. The combination as claimed in claim 10, wherein each of said sense lines is a digit input-sense output line; and wherein each memory cell comprises: eleven field-effect devices of the same conductivity type each having a source and a drain defining the ends of a conduction path through the device and a gate; first and second circuit points; a first impedance element connected in series with the conduction path of the first device, in that order, between the second and first circuit points; a second impedance element connected in series with the conduction path of the second device, in that order, between the second and first circuit points; means cross-coupling the drain electrodes of the first and second devices to the gates of the second and first devices, respectively; the conduction path of the third device being connected in series with the conduction path of the fourth device, in that order, between the drain of the first device and the first circuit point; the conduction paths of fifth and fourth devices being serially connected, in that order, between the drain of the second device and the first circuit point; the conduction paths of the sixth and seventh devices being serially connected, in that order, between the drain of the first device and the second circuit point; the conduction paths of the eighth and seventh devices being serially connected, in that order, between the drain of the second device and the second circuit point; means connecting the gates of the fifth and sixth devices to the first digit-input-sense output line of the associated column; means connecting the gates of the third and eighth devices to the second digit input-sense output line of the associated column; means connecting the conduction paths of the ninth and tenth devices in series, in that order, between a point of fixed potential and the first digit input-sense output line for the associated column; means connecting the conduction paths of the ninth and eleventh devices in series, in that order, between a point of fixed potential and the second digit input-sense output line of the associated column; means connecting the gates of the fourth, seventh and tenth devices to the first row line of the associated row; and means connecting the gate of the eleventh device to the second row line of the associated row.

No references cited.

BERNARD KONICK, *Primary Examiner.*

T. W. FEARS, *Assistant Examiner.*